(12) United States Patent
Beljean

(10) Patent No.: US 12,533,833 B2
(45) Date of Patent: Jan. 27, 2026

(54) PROCESS FOR MANUFACTURING A CUTTING TOOL FOR A VEGETATION CUTTING MACHINE AND CORRESPONDING CUTTING TOOL

(71) Applicant: SPEED FRANCE SAS, Arnas (FR)

(72) Inventor: Yann Beljean, Arnas (FR)

(73) Assignee: SPEED FRANCE SAS, Arnas (FR)

( * ) Notice: Subject to any disclaimer, the term of this patent is extended or adjusted under 35 U.S.C. 154(b) by 176 days.

(21) Appl. No.: 18/578,123

(22) PCT Filed: Jul. 28, 2022

(86) PCT No.: PCT/EP2022/071208
§ 371 (c)(1),
(2) Date: Jan. 10, 2024

(87) PCT Pub. No.: WO2023/006884
PCT Pub. Date: Feb. 2, 2023

(65) Prior Publication Data
US 2024/0316833 A1   Sep. 26, 2024

(30) Foreign Application Priority Data
Jul. 30, 2021   (EP) .................................... 21306066

(51) Int. Cl.
*B29C 43/00*   (2006.01)
*A01G 3/08*   (2006.01)
(Continued)

(52) U.S. Cl.
CPC ............ *B29C 43/003* (2013.01); *A01G 3/088* (2013.01); *B29C 43/021* (2013.01); *B29C 43/40* (2013.01);
(Continued)

(58) Field of Classification Search
CPC ...... B29C 43/003; B29C 43/021; B29C 43/40; B29C 2043/406; A01G 3/088; B29K 2077/00; B29L 2031/72
See application file for complete search history.

(56) References Cited

U.S. PATENT DOCUMENTS 4,250,622 A   2/1981  Houle
5,731,086 A *  3/1998  Gebhardt ............... H05K 3/045
                                                             428/522
(Continued)

FOREIGN PATENT DOCUMENTS

EP   3434093 A1   1/2019
WO   0048449 A1   8/2000

OTHER PUBLICATIONS

European Search Report in related EP Application No. 21306066, mailed Jan. 15, 2022.
(Continued)

*Primary Examiner* — Omar Flores Sanchez
(74) *Attorney, Agent, or Firm* — Thomas | Horstemeyer, LLP

(57) ABSTRACT

The invention relates to a process for manufacturing a cutting tool for a vegetation cutting machine, such as a brush cutter or an edge trimmer, comprising the following steps: (a) producing by an injection molding process at a first temperature a preform (200) made of a polyamide mixture comprising at least one homopolymer and at least one copolymer; (b) stamping the preform at a second temperature lower than the first temperature so as to cause polymer chains of the polyamide mixture to extend according to at least two different directions, thereby forming a planar piece (201), (c) cutting the planar piece (201) to define at least one cutting edge of the cutting tool (2).

15 Claims, 9 Drawing Sheets

(51) Int. Cl.
   *B29C 43/02*     (2006.01)
   *B29C 43/40*     (2006.01)
   *B29K 77/00*     (2006.01)
   *B29L 31/00*     (2006.01)

(52) U.S. Cl.
   CPC .... *B29C 2043/406* (2013.01); *B29K 2077/00* (2013.01); *B29L 2031/72* (2013.01)

(56) References Cited

U.S. PATENT DOCUMENTS

| | | | |
|---|---|---|---|
| 2004/0191496 A1* | 9/2004 | Rearick | C08J 7/0427 |
| | | | 428/318.4 |
| 2006/0130622 A1 | 6/2006 | Holmes | |
| 2013/0062806 A1* | 3/2013 | Mitadera | C08J 5/249 |
| | | | 156/60 |
| 2019/0136052 A1* | 5/2019 | Chino | C08L 9/06 |
| 2022/0168927 A1* | 6/2022 | Heikkila | B29C 70/088 |
| 2024/0067821 A1* | 2/2024 | Buzinkai | B29C 43/003 |

OTHER PUBLICATIONS

PCT International Search Report in related PCT Application No. PCT/EP2022/071208, mailed Oct. 20, 2022.

* cited by examiner

PROCESS FOR MANUFACTURING A CUTTING TOOL FOR A VEGETATION CUTTING MACHINE AND CORRESPONDING CUTTING TOOL

CROSS REFERENCE TO RELATED APPLICATIONS

This application is the 35 U.S.C. § 371 national stage application of PCT Application No. PCT/EP2022/071208, filed Jul. 28, 2022, which application claims the benefit of European Application No. EP 21306066.8 filed Jul. 30, 2021, both of which are hereby incorporated by reference herein in their entireties.

FIELD OF THE INVENTION

The invention relates to a process for manufacturing a cutting tool for a vegetation cutting machine, such as a brush cutter or an edge trimmer. Said cutting tool can be in the form of a disk or a blade.

BACKGROUND OF THE INVENTION

Vegetation cutting machines, such as brush cutters or edge trimmers, may use different types of cutting tools, depending on the kind of vegetation to be cut. The cutting tools are mounted in a cutting head which is coupled to a rotating shaft of the vegetation cutting machine. When caused to rotate with the cutting head around the shaft axis, the tool covers a round surface extending about the shaft axis, the diameter of this surface being called cutting diameter. Said cutting diameter is the diameter of the circle described by the end of the cutting tool during rotation of the cutting head.

Cutting filaments are a first type of cutting tool, mainly intended for cutting grass or for edging. Such cutting filaments are made of plastic, in particular polyamide, obtained by an extrusion process. At least one filament is loaded and secured in the cutting head, a free end of the filament extending out of the cutting head through an eyelet. To cut lawn or grass, filaments with a diameter comprised between 1.6 and 2.7 mm are usually used. For brushing, filaments with a diameter greater than 3 mm and including presenting sharp edges or teeth may be preferred. However, cutting filaments may present several drawbacks. First, such filaments are prone to abrasion or to breakage at the eyelet, thereby requiring frequent changes of filaments, which is tedious and time-consuming. Besides, for large cutting diameters (e.g. cutting diameters greater than 280 mm), the energetic consumption is high. In addition, due to its flexibility, the filament tends to flap during its rotation, which generates significant noise, requiring that the user wears individual hearing protection. At last, the cutting heads configured to receive filaments usually have a complex design and may be difficult to use, especially for non-professional users.

Plastic cutting blades, obtained by an injection molding process, are a second type of cutting tool, mainly intended for edging and for brushing dense or tough vegetation. However, such cutting blades also suffer from several drawbacks. First, the blade may break into several pieces as a result to an impact onto a solid obstacle, such as a stone, a tree stump or a tree trunk, etc. Such pieces may be projected several meters around the cutting head and may severely hurt the user or other persons in the vicinity. Besides, depending on the shape of the blades and the way they are attached to the cutting head, the energetic consumption of the vegetation cutting machine may be very high. At last, cutting blades are usually much more expensive than cutting filaments.

Metal disks are a third type of cutting tool, mainly used in regions with dense or dry vegetation. Metal disks also present a number of drawbacks, in particular the generation of sparks resulting from a contact with a stone, which may initiate a wildfire. Besides, such disks are very dangerous to use due to the high risk of injury. At last, like plastic cutting blades, metal disks may also break into several pieces further to an impact with a solid obstacle.

To date, none of the above-mentioned cutting tools provides a fully satisfactory solution.

In particular, energetic consumption is a rising issue for vegetation cutting machines.

These machines are often powered by gasoline, especially for professional use wherein the machine has to be used for several hours at a time.

In view of reducing air pollution caused by gasoline engines, electrically powered vegetation cutting machines have been developed. To that end, the vegetation cutting machine is connected to an electrical battery which is arranged for example in a backpack held by a user.

However, the power and autonomy of such vegetation cutting machines remain limited. In particular, the energetic consumption of the machine is linked with the aerodynamic drag and the cutting efficiency of the cutting tool (cutting filament or cutting blade). The battery level may thus decrease quickly. As a result, battery powered vegetation cutting machines are mainly dedicated to non-professional use.

In order to render electrically powered vegetation cutting machines compatible with a professional use, the energetic consumption should be strongly reduced.

SUMMARY OF THE INVENTION

A goal of the invention is thus to design and manufacture a cutting tool which minimizes the energetic consumption of a vegetation cutting machine.

To that end, an object of the invention is to define a process for manufacturing a cutting tool for a vegetation cutting machine, such as a brush cutter or an edge trimmer, comprising the following steps:
 (a) producing by an injection molding process at a first temperature a preform made of a polyamide mixture comprising at least one homopolymer and at least one copolymer;
 (b) stamping the preform at a second temperature lower than the first temperature so as to cause polymer chains of the polyamide mixture to extend according to at least two different directions, thereby forming a planar piece,
 (c) cutting the planar piece to form a planar cutting tool with at least one cutting edge.

In the present text, the term "planar cutting tool" means that the tool generally extends in at least two directions of a plane (unlike a cutting filament which is considered, in the context of the present text, as a linear cutting tool since it mainly extends along one principal direction of a plane). In particular, the cutting edge(s) of the tool extend(s) in a plane. Said plane is typically perpendicular to the axis of rotation of the tool.

In the present text, the term "freely rotatable" means that the cutting tool is allowed to make full rotations about the post (a full rotation covering an angular sector of 360°), in both directions. In this respect, the cutting head does not comprise any component capable of limiting the range of rotation of the cutting tool. When the cutting head is rotating within a certain speed range, the centrifugal force applied to the cutting tool may cause the cutting tool be blocked against the post by abutment. Thus, the cutting tool rotates at the same speed as the head and acts as a cutting edge of the head. However, in case of an impact onto a significant obstacle, the force exerted by the obstacle onto the tool may cancel the abutment and cause the tool to rotate in a direction opposite to the direction of rotation of the head, which avoids breakage of the tool and reduces the energy consumption of the machine because the rotation speed of the head remains always constant despite the impacts with the vegetation.

According to optional but advantageous embodiments, taken alone or in combination if appropriate:
- the second temperature is comprised between 15 and 30° C.;
- the stamping step (b) is repeated at least once;
- after the stamping step(s) (b) the planar piece has a thickness comprised between 1 and 3 mm;
- the injection molded part produced in step (a) has a cylindrical or a parallelepiped shape;
- the injection molded part has a thickness comprised between 6 and 10 mm;
- the planar piece produced in step (b) has a disk shape;
- the cutting step (c) is carried out using at least one of: a water jet, a laser beam, and a machining apparatus;
- the at least one homopolymer comprises PA6, PA8T and/or PA66 and the at least one copolymer comprises PA6-66.

Another object of the invention is a planar cutting tool for a vegetation cutting machine, made of a polyamide mixture comprising at least one homopolymer and at least one copolymer, wherein said cutting tool has polymer chains extending along at least two different orientations, and wherein said cutting tool has a substantially planar shape comprising a cutting edge and at least one attachment portion adapted to be attached to a cutting head of the vegetation cutting machine.

According to optional but advantageous embodiments, taken alone or in combination if appropriate:
- the cutting edge comprises teeth;
- the at least one homopolymer comprises PA6, PA8T and/or PA66 and the at least one copolymer comprises PA6-66;
- the polyamide mixture further comprises at least 20% of low-density polyethylene and at least one 1% of a compatibilization agent;
- the cutting tool is in the form of a cutting disk;
- the cutting tool comprises a plurality of apertures distributed over a surface of the disk;
- the cutting tool comprises at least one circular row of apertures arranged along a circumference of the disk, said apertures being configured to form a new cutting edge when the cutting edge has been worn out;
- the cutting tool is in the form of a cutting blade;
- the cutting tool presents a greater thickness in a central portion than in a peripheral portion.

BRIEF DESCRIPTION OF THE FIGURES

Further features and advantages of the invention will appear from the detailed description that follows, based on the appended drawings wherein.

DETAILED DESCRIPTION OF EMBODIMENTS

Planar Cutting Tools

Figure 1A:
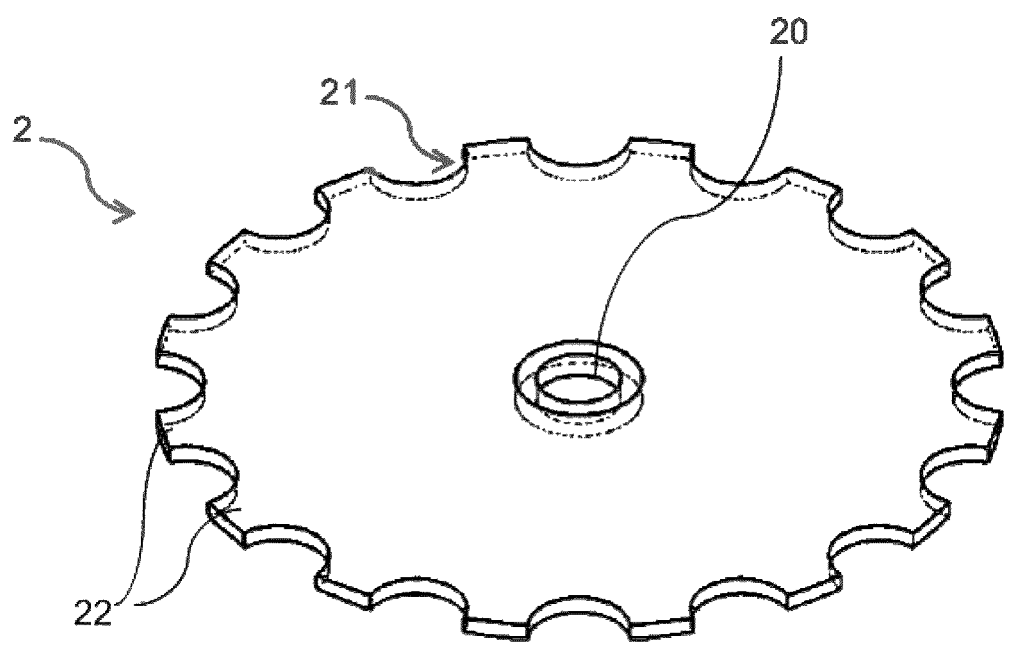
FIGS. 1A to 1E are perspective views of various embodiments of cutting disks according to the invention.

The present disclosure relates to the manufacturing of planar cutting tools intended to be used a cutting head for a vegetation cutting machine.

The cutting head comprises a first plate which serves as a support for a plurality of planar cutting tools. The first plate is also configured to be coupled to the shaft of the vegetation cutting machine, in a manner known per se. The first plate is thus caused to rotate around its central axis by the motor or engine of the vegetation cutting machine.

The cutting tools have a planar shape and a central bore 20 extending around an axis of rotation perpendicular to the plane of the tool. The cutting tools may advantageously be chosen among cutting disks and cutting blades. A cutting disk comprises a substantially circular cutting edge 21. A cutting blade has a substantially rectangular shape with two cutting edges 21 extending along opposite main sides of the rectangle. The cutting edges 21 may be provided with teeth 22 in order to increase the cutting effect of the tool.

The tools present a thickness of a few millimeters. The thickness of the cutting edges may be smaller than the thickness of the central portion of the tools. In particular, the central portion of the tool may have a thickness of at least 3 mm, in order to impart a sufficient mechanical strength to this portion which engages the post. Reducing the thickness of the tool in a peripheral portion thereof allows reducing the weight of the tool and increasing the cutting effect of the cutting edge. The thickness of said peripheral portion may be constant 20 or decreasing from the central portion to the edge.

The first plate comprises a plurality of posts, each configured to engage the central bore of a respective cutting tool so that each tool is freely rotatable in both directions relative to the post about its respective axis of rotation. The post may include a stop portion to ensure that a sufficient distance is maintained between the tool and the plate to avoid any friction of the tool onto the first plate when the tool is rotating.

When rotating, each cutting tool defines a circular cutting area whose diameter is the diameter of the disk (when the tool is a cutting disk) or the length of the blade (when the tool is a cutting blade). The cutting head has a cutting diameter defined by the maximum extent of the tools from the central axis of the cutting head. The cutting diameter is typically comprised between 200 and 400 mm.

Preferably, the cutting disks and cutting blades define substantially the same cutting area and present a central bore with a same size, so that cutting disks and blades may be interchangeably mounted on the same cutting head. A user may thus select either cutting disks or cutting blades, e.g. depending on the vegetation to be cut.

The tools are made of a mixture of polyamides including at least one homopolymer (such as polyamide 6 and/or polyamide 6-6) and at least one copolymer (such as polyamide 6-66). The tools may further include at least one filler, such as glass fibers, carbon fibers, aramide fibers, or different types of mineral fillers like talc or titanium or aluminum oxides. In some embodiments, the tools may also comprise a polymer different from polyamide, in addition to the at least one homopolymer and the at least one copolymer. As will be described in more detail below, the material and manufacturing process of the tools are chosen so as to promote a plurality of orientations of the polymer chains over the surface of the tool. Advantageously, due to said multiplicity of orientations of the polymer chains, the tools combine high tear strength and high impact resistance.

As compared to metal disks mentioned above, the plastic tools (disks or blades) present several advantages. First, they do not generate sparks and thus do not induce any risk of wildfire, even in dry vegetation. Besides, the risk of injury of the user when handling the tools is significantly reduced. In addition, with a material suitably selected to provide high tear strength and high impact resistance, the tools are less likely to break into several pieces in case of an impact with a solid obstacle.

The fact that the tools freely rotate about the posts also presents several advantages.

When the cutting head rotates at low speed (e.g. at the beginning of the operation of the vegetation cutting machine), the tools are also caused by the centrifugal force to rotate about the posts.

When the cutting head rotates within a certain speed range (e.g. in normal use), the centrifugal force is sufficiently high as to cause the tool to abut the post, thereby blocking it. The tool is thus fixed relative to the cutting head. The obtention of this effect depends on the weight of the tool, the rotational speed of the cutting head and the position of the post relative to the center of rotation of the cutting head. As long as the tool encounters small obstacles, it remains fixed relative to the cutting head and acts as a cutting edge which rotates at the same speed as the cutting head.

This effect may be cancelled when a tool hits an obstacle of sufficient size and/or weight. In this case, the abutment is cancelled and the tool is caused to rotate in reverse direction instead of breaking.

In case the tool repeatedly encounters such significant obstacles, its rotational speed in reverse direction of the cutting head may become stationary. Said speed may be, in absolute value, of the same order as the one of the cutting head. Said reversal effect is further enhanced by teeth or other types of indentations provided along the cutting edges.

In this latter situation, the tools thus have a first rotational speed (relative to the shaft axis) whose direction and value are identical to the rotational speed of the cutting head, combined with a second rotational speed (about the posts), whose direction is opposite to the rotational speed of the cutting head.

In addition, since the cutting tools are flat and rotate in a same plane (or in parallel planes), the flapping effect mentioned above for the cutting filaments may be avoided. Thus, energetic consumption and noise generated by the cutting head are reduced.

Besides, the energy provided by the motor of the cutting machine is increased by the kinetic energy of the impacts that cause the tools to rotate in reverse direction. By contrast, in known cutting heads, any impact of the cutting tool onto an obstacle has the effect of slowing down the rotation of the cutting head, thereby involving an increased energetic consumption to restore the rotational speed of the cutting head.

FIGS. 1A to 1E are perspective views of various embodiments of cutting disks according to the present invention. As can be seen on these figures, the shape of the teeth 22 may be varied depending on the type of vegetation to cut and the desired cutting efficiency.

Figure 1B:
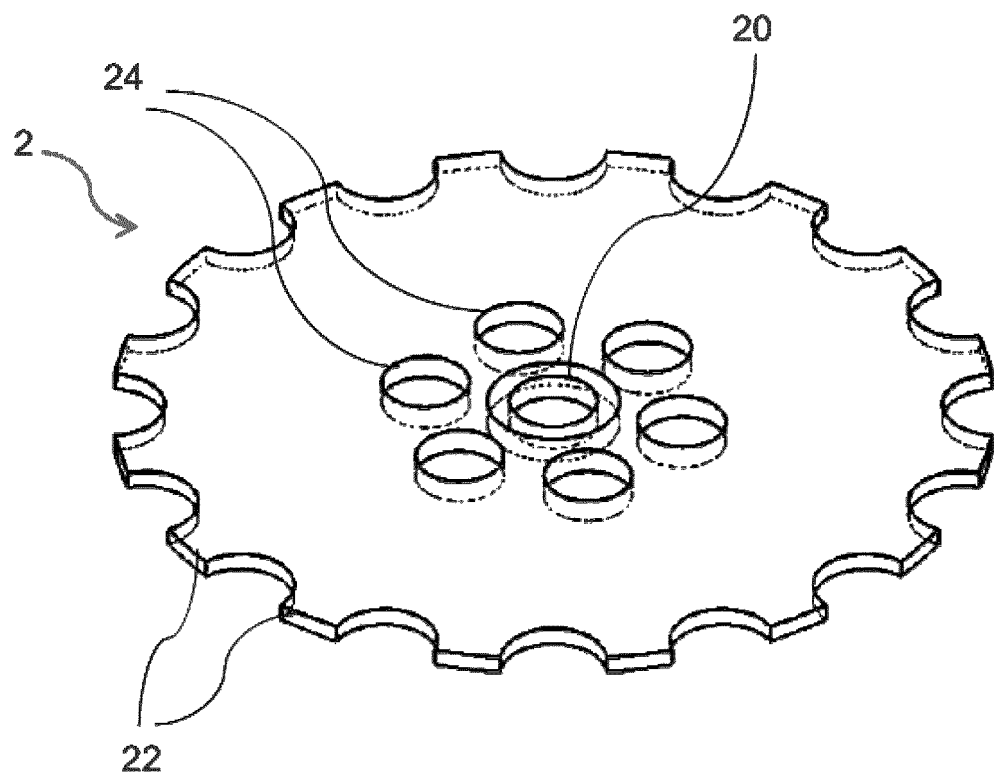
Figure 1C:
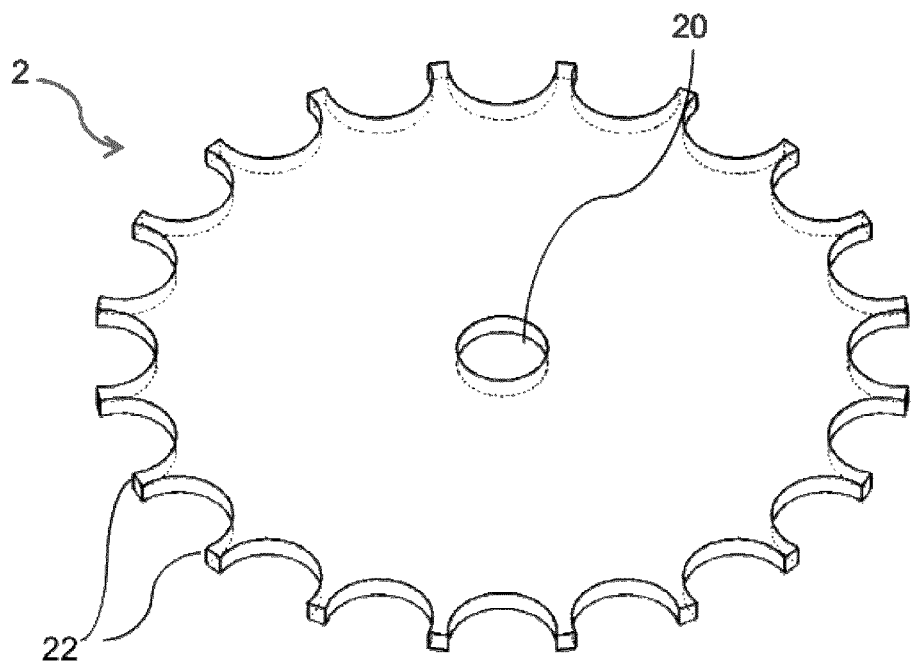
Figure 1D:
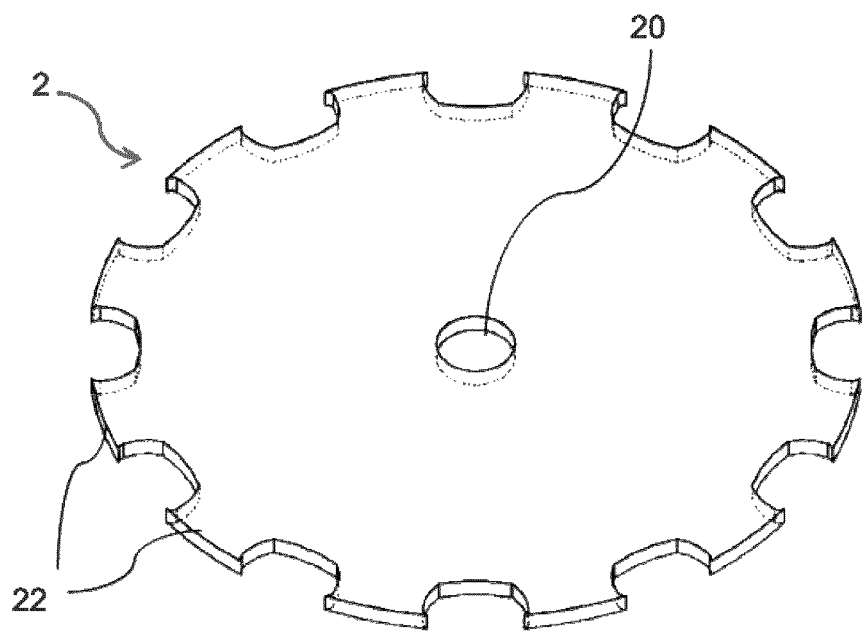

In the embodiment of FIG. 1B, the disk is not plain but comprises a plurality of apertures 24 arranged around the center of the disk, these apertures allowing to reduce the weight of the cutting disk. Of course, such apertures may also be arranged according to another pattern.

Figure 1E:
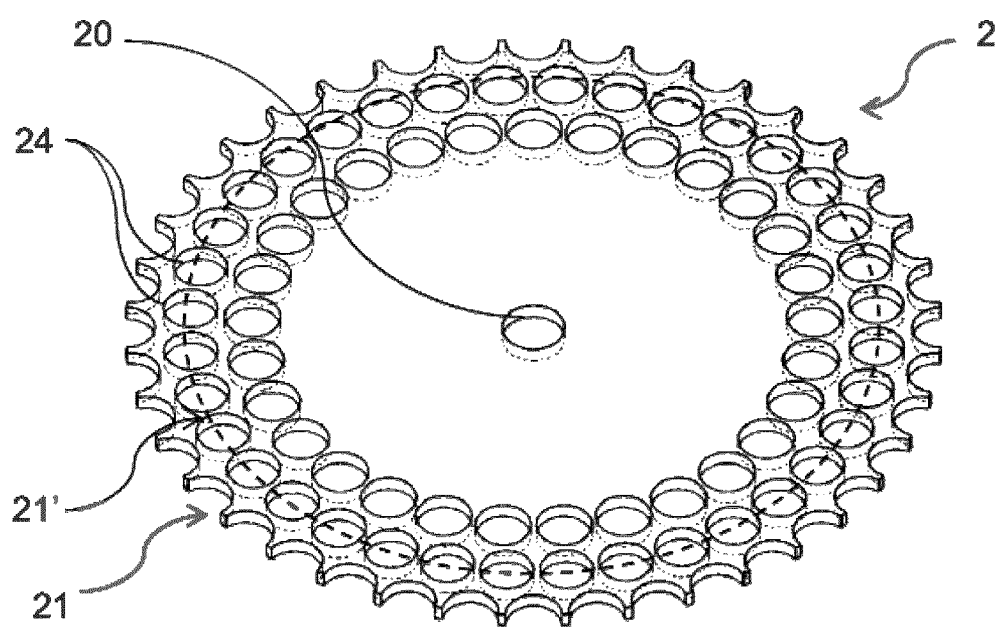

In the embodiment of FIG. 1E, the apertures 24 are provided at the vicinity of the cutting edge. In addition to the above mentioned reduction of weight, the apertures are configured to form a new cutting edge 21' when the cutting edge 21 has been worn out, with substantially the same profile as the initial cutting edge 21 but a smaller diameter. Several concentric rows of apertures may be provided.

Figure 2A:
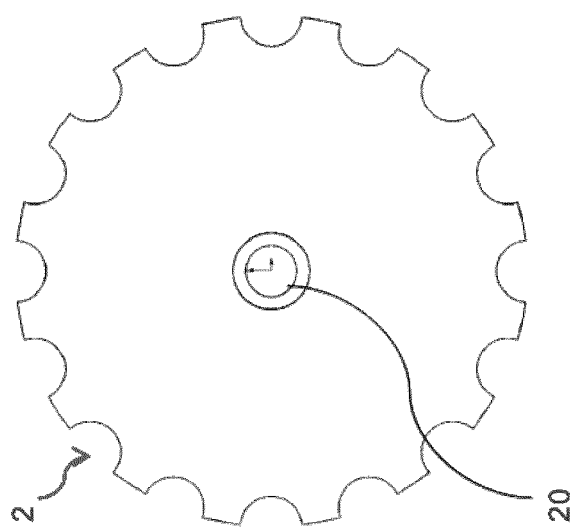
FIGS. 2A to 2C are top and side views of embodiments of a cutting disk, with various embodiments to adjust the weight of said cutting disk.
Figure 2A:
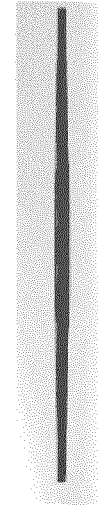
Figure 2B:
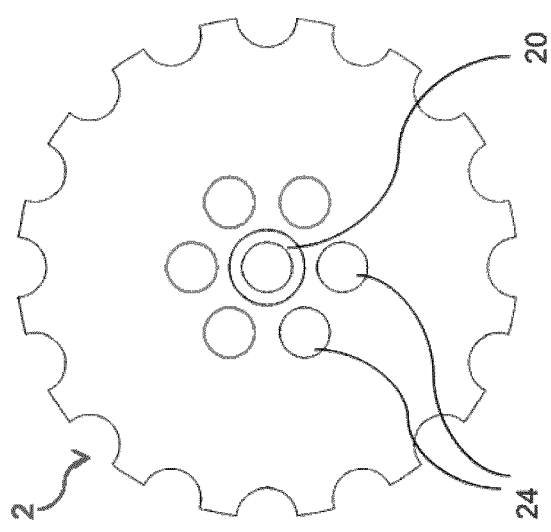
Figure 2B:
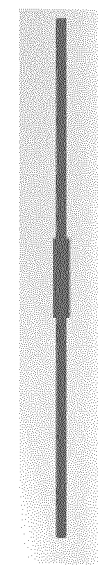
Figure 2C:
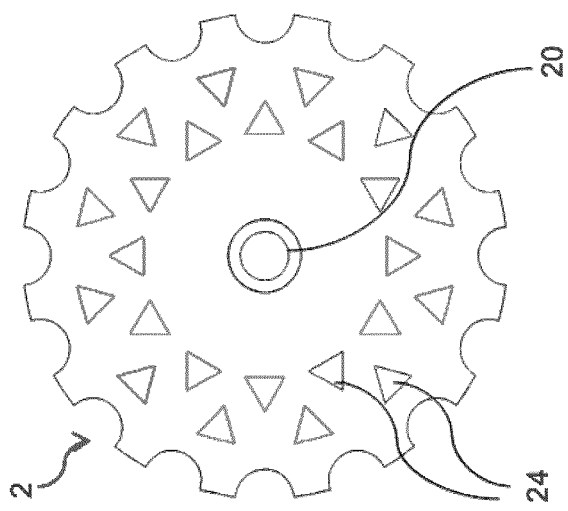

FIGS. 2A to 2C illustrate various features of a cutting disk that may be modified to adjust the weight of the disk. These features include the presence of apertures in the surface of the disk, as well as the thickness of the disks.

In FIG. 2A, the disk 2 has a plain surface and a thickness which varies from 3 mm at the center to 2 mm at the circumference.

By making the thickness of the disk vary from 3 mm to 1.5 mm, the weight of a 100 mm diameter disk may be reduced by 11%.

By providing six round apertures 24 arranged along a circle in the surface of the cutting disk (see top of FIG. 2B), and with a thickness of the disk varying from 3 to 1.5 mm, the weight of a 100 mm diameter disk may be reduced by 19% compared to the disk of FIG. 2A.

Instead of continuously varying the thickness along the radius of the disk, one may provide the disk with two different constant thicknesses: a 3 mm thick central portion and a 2 mm thick peripheral portion (see bottom of FIG. 2B). As compared to the disk of FIG. 2A, the disk of FIG. 2B has a weight reduced by 41% (the diameter of the disk still being 100 mm).

In FIG. 2C, the cutting disk 2 is provided with triangular apertures 24 distributed over its surface according to two concentric circles. These apertures are located closer to the periphery than the apertures of FIG. 2B. With a thickness of the disk varying from 3 to 1.5 mm, the weight of a 100 mm diameter disk may be reduced by 20% compared to the disk of FIG. 2A.

The skilled person may thus choose the design of the cutting disk depending on the targeted weight of the cutting disk.

Whatever the embodiment, the disks preferably have a diameter between 50 and 150 mm, preferably about 100 mm. The surface of the disks protruding from the first and second plates may be comprised between 20 and 40%, preferably between 30 and 35%.

For a cutting machine rotating at 6,000 rpm or more, the weight of the disks is at most g.

Figure 3A:
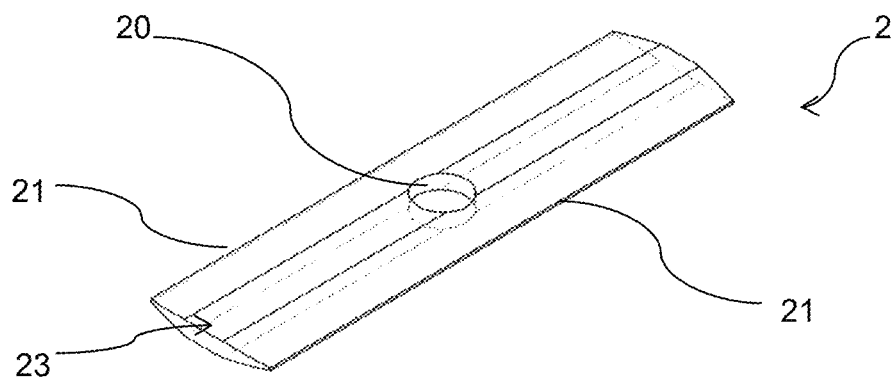
FIGS. 3A to 3C are perspective views of various embodiments of cutting blades according to the invention.
Figure 3B:
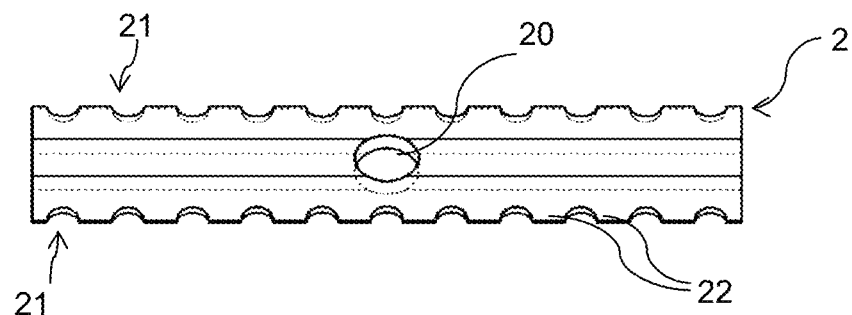
Figure 3C:
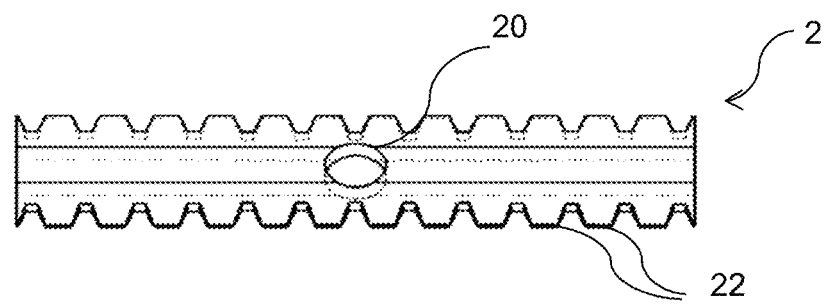

FIGS. 3A to 3C are perspective views of various embodiments of cutting blades according to the present invention. Each blade comprises two cutting edges 21 extending along the principal axis of the blade. The cutting edges are usually thinner than the central portion 23 that comprises the central bore 20. In the embodiment of FIG. 3A, the cutting edges are straight, whereas in the embodiments of FIGS. 3B and 4C, the cutting edges are provided with teeth 22.

Of course, the figures are only provided as illustrations and are not intended to limit the possible shapes of the cutting tools.

Process for Manufacturing the Planar Cutting Tools

The planar cutting tools as described above are manufactured by a process comprising at least two steps, preferably three steps.

A first step comprises the formation of a preform by an injection molding process.

In particular, the preform can have a substantially cylindrical shape if the cutting tool is a disk, or a parallelepiped shape if the cutting tool is a blade. The preform has a smaller diameter and a greater thickness than the cutting tool to be manufactured, with substantially the same volume as the cutting tool. For example, to manufacture a cutting disk presenting a diameter of about 100 mm and a maximum thickness of 3 mm, the preform can present a diameter of about 75 mm and a thickness of about 10 mm. To manufacture a cutting blade presenting a length of about 100 mm and a maximum thickness of 3 mm, the preform can present a length of about 40 mm, a width of about 6 mm and a thickness of about 10 mm.

The preform is made of a mixture of polyamides comprising at least one homopolymer (e.g. PA6 or PA6-6) and at least one copolymer (e.g. PA6-66).

The amount of homopolymer(s) and copolymer(s) in the mixture can vary from 80%/20% to 20%/80% by weight.

In addition, the mixture may further include at least one filler, such as glass fibers, carbon fibers, aramide fibers, or different types of mineral fillers like talc or titanium or aluminum oxides.

The mixture may also include at least one polymer different from polyamide, such as low-density polyethylene; in such case, the mixture may advantageously also comprise a compatibilization agent. The compatibilization agent may be in particular maleic anhydride. Preferably, the amount of low-density polyethylene can be at least 20% of the total weight of the mixture, and the amount of maleic anhydride can be at least 1% of the total weight of the mixture (as a result, the amount of the homopolymer and the copolymer polyamides is at most 79% of the total weight of the mixture. Such addition of low-density polyethylene allows obtaining a mixture presenting a greater softness and resistance to shocks as compared to a mixture comprising only polyamides.

The preform is placed in a stamping mold.

Figure 4A:
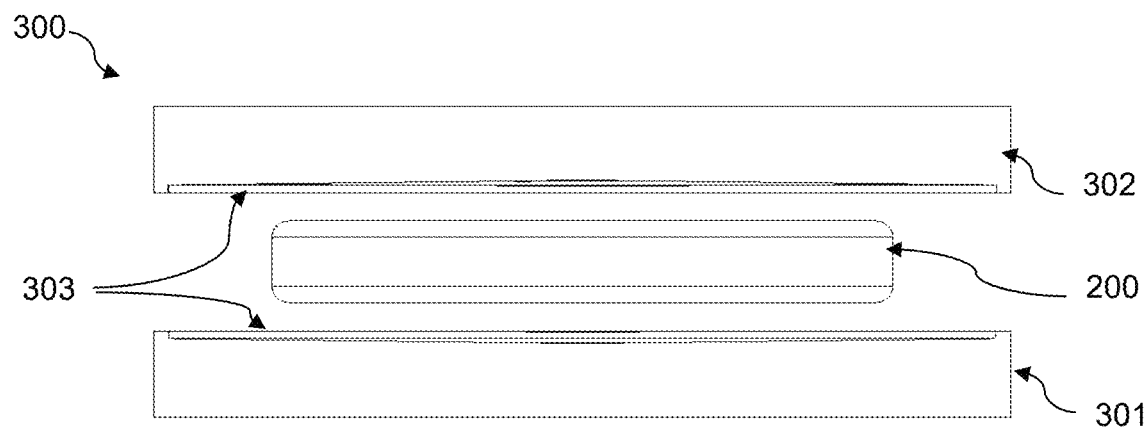
FIGS. 4A and 4B schematically illustrate steps of the process for manufacturing the cutting disks or blades.

As shown in FIG. 4A, the stamping mold 300 comprises a lower part 301 in which the preform 200 is placed and an upper part 302. The lower and upper parts 301, 302 together form an inner molding cavity 303 that defines the outer surface of the cutting tool to be obtained.

The mold 300 is placed in a stamping press (not shown) in which the upper part 302 is applied onto the perform 200 to close the mold, with a sufficient pressure to deform the preform to conform to the inner molding cavity. The mold may be lubricated with graphite.

The stamping step is carried out at a temperature lower than the injection molding process for forming the preform. Advantageously, the stamping step can be carried at ambient temperature, i.e. between 15 and 30° C.

For example, the stamping press can apply a pressure up to 250 tons. For a preform having a diameter of 75 mm, the force exerted on the preform is thus of 31.83 kg/mm².

Under said force, the polymer chains of the material of the preform are forced to extend in all directions in a plane extending perpendicular to the direction of application of the stamping force. To the contrary, laminating, rolling or drawing processes would orient the polymer chains in a common direction, which is not suitable in the present case.

If appropriate, the stamping step can be repeated at least once.

Figure 4B:
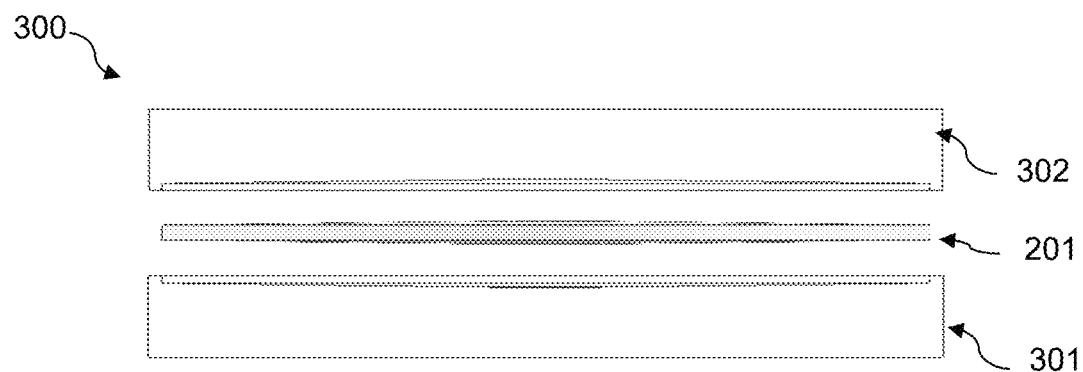

As shown in FIG. 4B, after deformation of the preform, the stamping mold can be obtained and a stamped piece 201 can be extracted from the mold. The stamped piece has substantially the same dimensions as the cutting tool to be obtained. In particular, the stamped piece has the same thickness as the cutting tool.

The diameter of the stamped piece 201 can be substantially the same as the diameter of the cutting tool, or greater than said diameter.

Advantageously, the stamped piece can be cut along its circumference to remove potential defects due to stamping and form a cutting edge. Said cutting edge may be smooth or toothed. The central bore and, if any, other holes passing through the cutting tool can also be cut. Said cutting step can be carried out by a laser beam or a water jet, but other cutting techniques could be used.

Thanks to the multiplicity of directions of orientation of the polymer chains, the cutting tool presents a greater resistance to shocks from all directions.

Experimental Results

Several compositions have been tested:
C1: blend comprising 50% Polyamide 6+50% Co-polyamide 6-66 (this composition has been processed with the injection molding/stamping process described above)
C2: blend 70% Co-polyamide 6-66+30% Polyamide 6 filled with 40%6 mm-glass fiber (this composition has been processed with a standard injection molding process, not within the scope of the present invention);
C3: blend 70% Co-polyamide 6-66+30% Polyamide 6 filled with 40%300 µm-glass fiber (this composition has been processed with a standard injection molding process, not within the scope of the present invention).

Specimens of various shapes have been formed, with the same size for each composition.

Characterization of the specimens has been made using a SHIMADZU testing machine, according to the three following tests:
3-point bending;
resistance to tearing.
tip penetration.

The 3-point bending test allows quantifying the force necessary to deform a specimen having a blade shape over a given stroke (2 mm in the present experiments). This allows comparing the deformation capacity of the different mixtures tested. The higher the force required, the more brittle the material will be and therefore the smaller its resistance to impact.

Figure 5A:
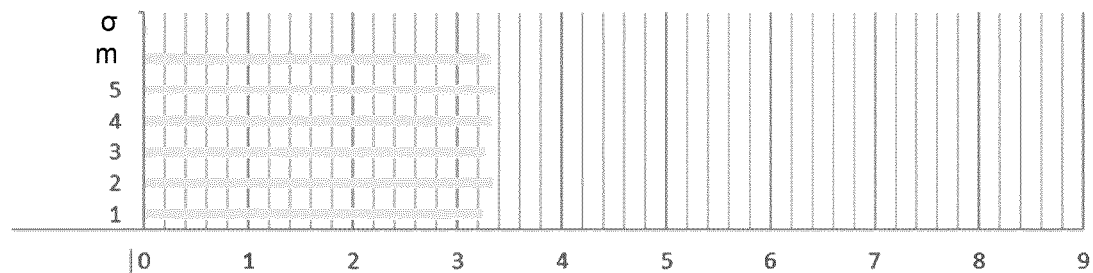
FIGS. 5A-5C illustrate the results of a 3-point bending test for three different compositions and manufacturing processes.
Figure 5B:
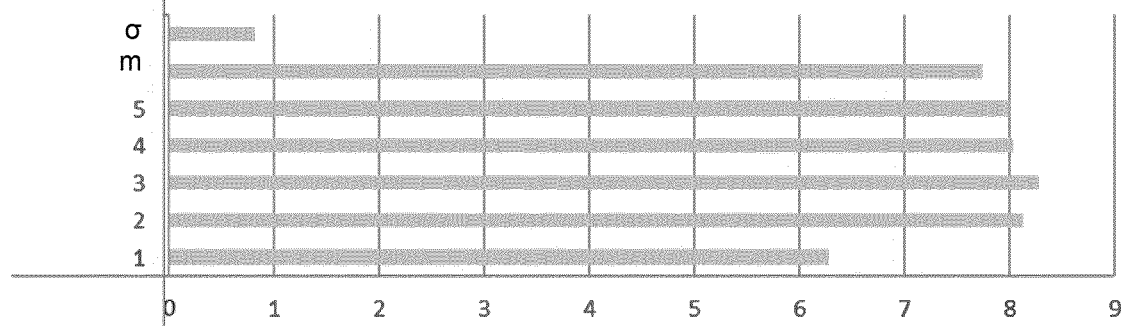
Figure 5C:
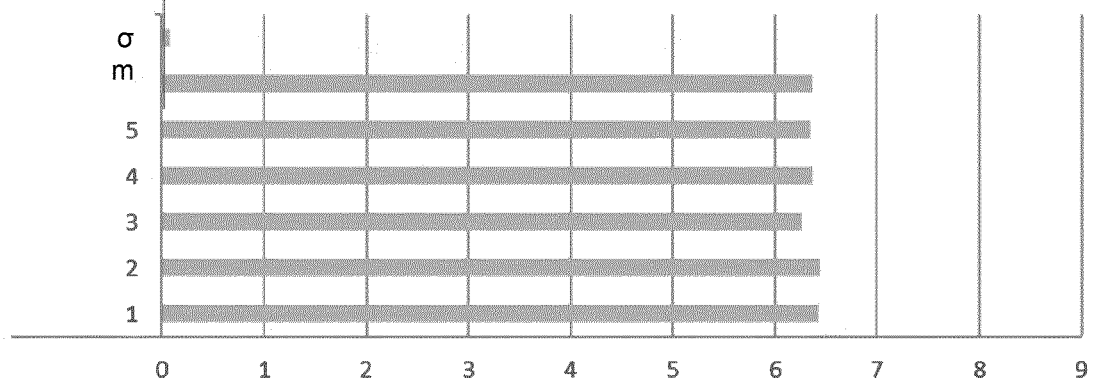

FIGS. 5A-5C illustrate the results obtained with compositions C1, C2 and C3, respectively. The abscissa of the graphs is the force, expressed in N. σ designates the standard deviation and m designates the mean calculated based on the results obtains for the five specimens.

Composition C1 has a much more satisfactory behaviour than compositions C2 and C3. We note a lower average force required for bending than the other two compositions as well as a low standard deviation, which guarantees the repeatability of the results on the tested specimens.

The resistance to tearing test allows characterizing the ability of the materials of not to break up on impact and to have a high resistance to tearing.

For "trouser" type specimens, the force necessary to tear a 100 mm long specimen has been quantified. The displacement of the machine crossbeam has also been quantified. The higher the force and the greater the displacement of the machine crossbeam, the better the resistance of the material to tearing without premature breakage.

Figure 6A:
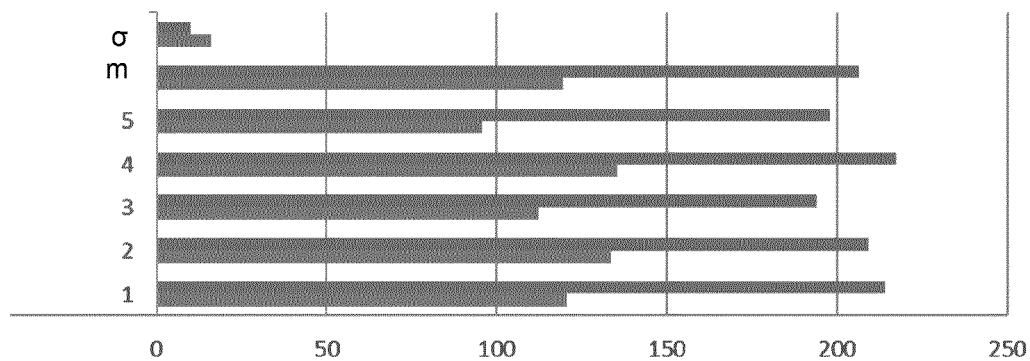
FIGS. 6A-6C illustrate the results of a tear resistance test for three different compositions and manufacturing processes.
Figure 6B:
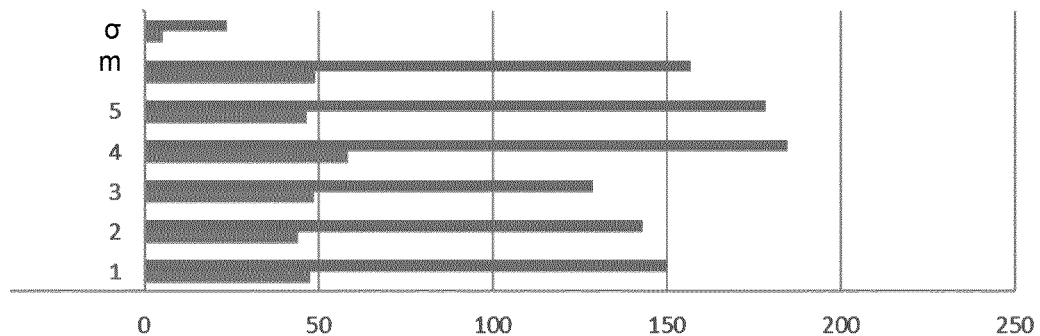
Figure 6C:
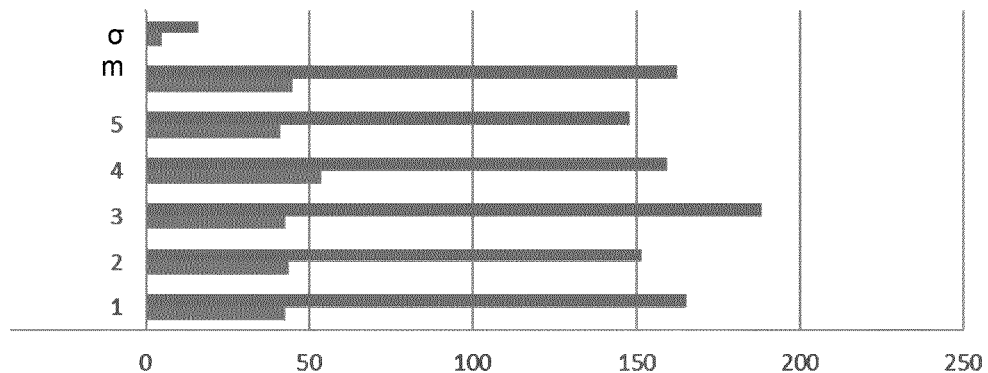

FIGS. 6A-6C illustrate the results obtained with compositions C1, C2 and C3, respectively. For each specimen, the abscissa of the graphs is the force, expressed in N (upper bar) and the displacement of the machine crossbeam, expressed in mm (lower bar). σ designates the standard deviation and m designates the mean calculated based on the results obtains for the five specimens.

One can note a high force required for tearing and at the same time a very important displacement of the machine crossbeam for composition C1. One can therefore deduce that this composition has a good tearing behaviour and a high impact resistance. On the other hand, compositions C2 and C3 exhibit lower forces required for tearing and present a premature breakage evidenced by small displacements of the machine crossbeam.

This can be explained by the fact that, during the stages of transformation of the material, the material passes from an amorphous state to a crystalline state. The orientation of the polymer chains differs depending on the geometry of the cutting disk and its method of manufacturing.

Tip penetration allows characterizing the differences in molecular orientations in a simple and mechanical way. To do this, for a cutting tool having a disk shape, nine measurements were taken per specimen, one in the center and eight in the periphery. It is thus possible to observe the difference in orientation depending on the force needed to penetrate the tip in the material for a given stroke (1 mm in the present case).

Figure 7A:
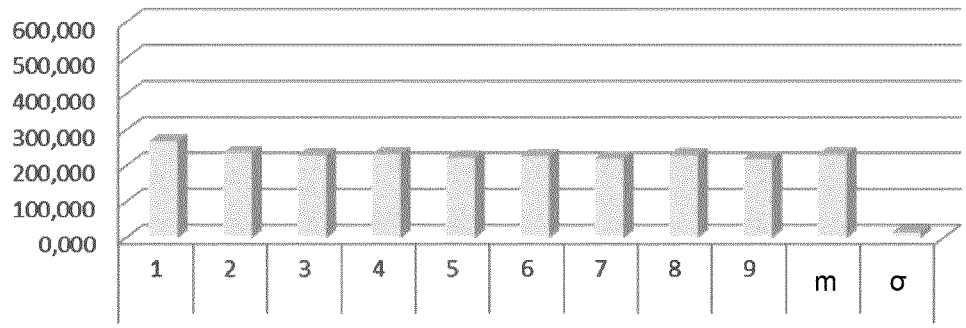
FIGS. 7A-7C illustrate the results of a tip penetration test for three different compositions and manufacturing processes.
Figure 7B:
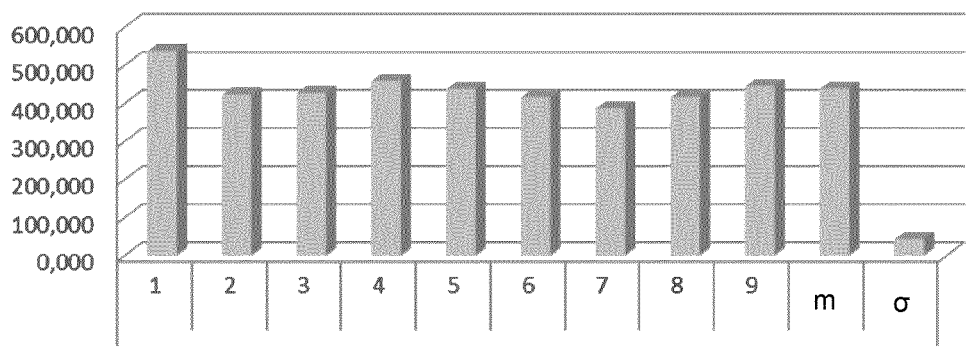
Figure 7C:
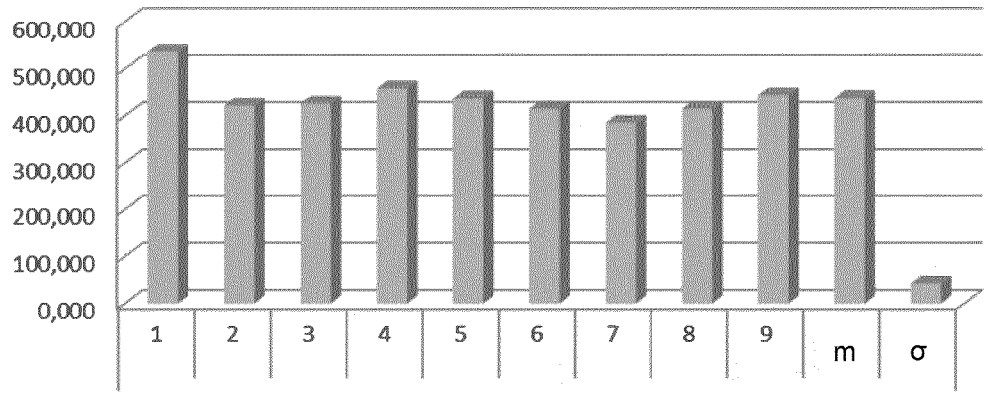

FIGS. 7A-7C illustrate the results obtained with compositions C1, C2 and C3, respectively. The ordinate of the graphs is the force, expressed in N. σ designates the standard deviation and m designates the mean calculated based on the results obtains for the nine specimens.

One can observe that the penetration force is smaller in the case of the first composition, which indicates a controlled multi-orientation of the polymer chains and thus a less brittle material behaviour. A slight difference is also observed between the central region of the disk and the peripheral region. This effect was initially sought to guarantee a good mechanical resistance to absorb shocks in the center of the cutting disk and a good behavior on the cutting edge of the cutting tool.

The invention claimed is:

1. A process for manufacturing a cutting tool for a vegetation cutting machine, comprising:
   (a) producing by an injection molding process at a first temperature a preform made of a polyamide mixture comprising at least one homopolymer and at least one copolymer;
   (b) stamping the preform at a second temperature lower than the first temperature to cause polymer chains of the polyamide mixture to extend according to at least two different directions, thereby forming a planar piece,
   (c) cutting the planar piece to define at least one cutting edge of the cutting tool.

2. The process of claim 1, wherein the second temperature is comprised between 15 and 30° C.

3. The process of claim 1, wherein after stamping (b) the planar piece has a thickness comprised between 1 and 3 mm.

4. The process of claim 1, wherein the preform has a cylindrical or a parallelepiped shape.

5. The process of claim 4, wherein the preform has a thickness comprised between 6 and 10 mm.

6. The process of claim 1, wherein the planar piece has a disk shape.

7. The process of claim 1, wherein cutting (c) is carried out using at least one of: a water jet, a laser beam, and a machining apparatus.

8. The process of claim 1, wherein the at least one homopolymer comprises at least one of PA6, PA6T and PA66 and the at least one copolymer comprises PA6-66.

9. A cutting tool for a vegetation cutting machine, made of a polyamide mixture comprising at least one homopolymer and at least one copolymer, wherein said cutting tool has polymer chains extending along at least two different orientations, and wherein said cutting tool has a substantially planar shape comprising a cutting edge and at least one attachment portion adapted to be attached to a cutting head of the vegetation cutting machine.

10. The cutting tool of claim 9, wherein the cutting edge comprises teeth.

11. The cutting tool of claim 9, wherein the at least one homopolymer comprises at least one of PA6, PA6T and PA66 and the at least one copolymer comprises PA6-66.

12. The cutting tool of claim 9, wherein the polyamide mixture further comprises at least 20% of low-density polyethylene and at least 1% of a compatibilization agent.

13. The cutting tool of claim 9, being in the form of a cutting disk.

14. The cutting tool of claim 13, comprising a plurality of apertures distributed over a surface of the disk.

15. The cutting tool of claim 9, presenting a greater thickness in a central portion than in a peripheral portion.

* * * * *